Patented Oct. 1, 1940

2,216,485

UNITED STATES PATENT OFFICE 2,216,485

EMULSION

Robert Louis Brandt, New York, N. Y., assignor to Colgate-Palmolive-Peet Company, Jersey City, N. J., a corporation of Delaware No Drawing. Application August 1, 1938, Serial No. 222,551

1 Claim. (Cl. 167—91)

This invention relates to the preparation of dispersions and more particularly to industrial and cosmetic emulsions which are characterized by their stability and universal application, and having as one of their essential ingredients a new, efficient, and versatile dispersing agent.

It has been the practice in the preparation of industrial emulsions to use a great variety of emulsifying agents selected for their individual qualities and capabilities depending on the ultimate use of the emulsion. Most of these agents have serious disadvantages which prevent their universal use and reduce their effectiveness in the manufacture of certain types of emulsions. For example, it is difficult to obtain an emulsifying agent which will operate effectively in both acid and alkaline media. If a compound such as sodium lauryl sulphate is used as an emulsifying agent in a highly alkaline medium, the compound is converted to lauryl alcohol and a sulphate. On the other hand, if an emulsifying agent such as soap is used in a concentrated acid medium, it will be decomposed to yield a fatty acid and a salt. Furthermore, the presence of dissolved electrolytes will tend to break emulsions prepared with these agents.

The emulsifying efficiency of many of these materials, such as common soap, is very low, and consequently a large quantity is necessary, thus impairing the physical properties of the emulsified composition. Temperature changes likewise have a detrimental effect on the emulsions prepared with the average emulsifying agent. In some cases it is desirable to have low colored products with a minimum of odor, which results are difficult to obtain with the available emulsifying agents. In the preparation of water emulsions it is very often necessary or advantageous to use hard water, and consequently many of the common dispersing agents will prove either inoperative or insufficient in the usual quantities. Likewise many of these agents, such as saponine, should not be used in the manufacture of food products, such as ice cream or mayonnaise, due to their toxic nature.

It has now been found that stable emulsions can be manufactured by the use of a newly discovered dispersing agent which will be fully described hereinafter. This novel material has proven to be extremely versatile in its capabilities and adapted for use in emulsions for a wide variety of purposes. An unusual feature of this emulsifier is its ability to form permanent emulsions in both basic and acidic media. Likewise this agent is extremely effective, and it is possible to make stable emulsions by including but a very small amount of said agent which, of course, makes an emulsion with better physical properties as well as permitting a considerable monetary saving.

Emulsions having this agent incorporated therein have proven to be stable even at very high and very low temperatures. Furthermore, emulsions prepared with this compound are not readily destroyed by the presence of dissolved electrolytes. Food product emulsions are not rendered toxic by the use of this agent. Again, water emulsions can be readily made by the use of this dispersing agent with hard water which is a great commercial advantage. Emulsions requiring low color properties and/or a minimum of odor can also be made by the use of this new material.

For the purpose of forming the new emulsions herein described, the particular type of dispersing agent is a unique sulphonated mineral oil derivative. This sulphonated petroleum material possesses a usefulness in such compositions which is not possessed by all materials of the class generally designated sulphonated petroleum emulsifying agents. The special type of sulphonated petroleum to be used in these emulsion compositions is that disclosed in the applicant's copending applications, Serial No. 117,096, filed December 21, 1936, Patent No. 2,149,661; Serial No. 138,463, filed April 22, 1937, Patent No. 2,149,662; and Serial No. 211,946, filed June 4, 1938, Patent No. 2,179,174 (which discloses a preferred method for making the sulphonate); and which may be briefly described as the reaction product of a liquid sulphur dioxide solution of a material obtained from mineral oil by solvent extraction, and a sulphonating agent.

These new products of the sulphonation of liquid sulphur dioxide solutions of mineral oil extracts may be prepared from a mineral oil, preferably a lower viscosity, raw distillate of a naphthene base crude such as Texas Gulf Coast crude. The first step usually is to treat the crude distillate with an extractant such as liquid sulphur dioxide, liquid sulphur dioxide plus benzol, or other selective solvents such as furfural phenol, nitrobenzene, dichloroethyl ether, a propane-cresylic acid mixture or the like. This operation yields a hydrocarbon oil extract which is characterized by high specific gravity in comparison to the starting oil, extremely low viscosity index, high Conradson carbon, and a high degree of unsaturation. It is generally thought that the extracts so obtained are composed of the more aromatic and unsaturated of the hydrocarbons constituting the original oil. Repeated extractions of the oil at hand may be made, but this is not quite so satisfactory as less exhaustive extraction.

This extract, unless liquid sulphur dioxide was the selective solvent, is freed from the solvent and, according to the earlier filed application referred to above, is then dissolved in liquid sulphur dioxide and sulphonated in this solution.

The later filed applications show the refinements in preparing the improved products, which are most desirable in this invention, by the additional processing of the mineral oil preferably after the extraction, but which may be accomplished either before or after the extraction and/or by carrying out the extraction under particular conditions; and by the short period of reaction.

The additional processing mentioned may comprise further narrowing of the boiling range of the portion of the oil to be sulphonated, by additional fractionation of the material after extraction or by additional or more specific fractionation prior to extraction. It may also comprise treatment of the material to be used for sulphonation, with caustic soda to remove certain undesirable acidic constituents, treatment with sulphuric acid to remove asphalt-like and highly reactive bodies and water, and treatment with contact clay to assist in the sulphuric acid sludge removal.

Furthermore, control of the conditions during the extraction are highly important in preparing a good colored product. By maintaining the temperature relatively low, that is, around −15° C. to 15° C. during the extraction, the final products are improved as to odor, color, and detersive and emulsifying efficiency.

The preferred form employs a combination of all of the treatments mentioned, and the detergining, wetting, and emulsifying efficiency, yield, odor, and color of the products have been found to be materially improved thereby. Any one of the steps, however, is of importance and contributes toward a better product.

In any of the processes of the three applications, the next step after treatment of the extract consists in dissolving the treated extracted materials in liquid sulphur dioxide, or, the extracted materials being already in sulphur dioxide solution from the solvent extraction process, the next step may consist in diluting the solution with as much more sulphur dioxide as may be necessary to prepare it for subsequent steps in the process. Usually, the extracted materials should be diluted with about one to two times the volume of liquid sulphur dioxide. The resulting solution of extracted material in liquid sulphur dioxide is, even at low temperatures (below 0° C.) very fluid and non-viscous.

Having the desired solution of extracted material in liquid sulphur dioxide, the solution is cooled and mixed with a sulphonating agent, such as fuming sulphuric acid, keeping the temperature quite low during the mixing. Preferably, the temperature will be kept below −5° C., during the mixing, though some extracted materials from some crude oil sources may permit or require either higher or lower temperatures. Agitation should be used, and in the event a batch method is employed, it has been found preferable to add the acid dissolved in liquid sulphur dioxide to the hydrocarbon oil solution, instead of the reverse, since this permits closer temperature control. Fuming sulphuric acid (commercial 20% oleum) in a quantity about equal in weight to the extracted material to be treated has been found satisfactory. It readily dissolves in liquid sulphur dioxide at low temperatures. Sulphur trioxide, chlorsulphonic acid, or other sulphonating agents or solutions of the sulphonating agents in liquid sulphur dioxide may also be used.

Upon completion of the original mixing of ingredients, the reacting solution will usually be raised to a temperature somewhat higher than that at which the original mixing took place. The reaction may be allowed to continue under agitation for about an hour and one-half to three hours; however, a more desirable product is produced when a shorter reaction period, not to exceed fifteen minutes and preferably not more than five minutes, is used, as is disclosed in my copending application Serial No. 211,946.

The treatment with the sulphonating agent having been completed, the sulphur dioxide is removed by evaporation, preferably at or below the treating temperature, and may be recovered in a suitable manner. The remaining material is diluted with cold water, the temperature not being allowed to rise above about 20° C., and neutralized with a basic compound, such as caustic soda, caustic potash, soda ash, amines, ammonia, alkylolamines, lime or the like.

In order to prepare a finished product of the best quality, it is preferred, either before or after the neutralization, to wash the product with a low boiling hydrocarbon solvent such as a Pennsylvania grade gasoline that is substantially volatile in the presence of steam at a temperature below that at which the final product is to be dried.

The solution of neutralized sulphuric acid reaction product, which also contains a considerable proportion of the sulphate of the neutralizing material as a result of this reaction with the excess sulphuric acid present may be used in this state for many purposes, or it may be further purified by extracting with ethyl, n-propyl, iso-propyl, butyl, or other alcohols in which the active ingredient is soluble, to free it from the by-product inorganic sulphate formed in the neutralizing process. The electrolyte-free material is, of course, a more effective emulsifier than the mixture.

A more detailed description of the preferred method of making the solution-sulphonated mineral oil extract is outlined in the following specific example in order to give a better understanding of the invention and the most desirable type ingredients.

According to the preferred process, a distillate from Texas Gulf Coast crude boiling between 130° C. and 350° C. at 5 mm. pressure and having a Saybolt viscosity of 80 seconds at 100° F., may be countercurrently extracted with approximately an equal volume of liquid sulphur dioxide by the usual Edelreanu process but at a temperature of around −10° C. and the sulphur dioxide separated from the extract. The mineral oil extract is fractionally distilled, in vacuum, in the presence of about 0.1% of its weight of caustic soda. The fraction taken between 210° C. and 250° C. at 5 mm. is then refractionated to the narrower range of between 220° C. and 240° C. at 5 mm. pressure, which fraction is then treated with about 1% of its weight of 92% sulphuric acid in the conventional manner for the removal of sludge impurities. Most of the sludge will settle out at once, but the remainder, which is known as "pepper" sludge, has a tendency to remain in suspension, and it will usually be found desirable to remove this sludge by dispersing in the material about 0.2% of the weight of the material of contact clay, and heating to 130° and 150° C. out of contact with the air. Upon filtering, the oil will be found bright and clear. Centrifuging may be employed instead of, or in addition to, the contact clay treatment.

There may be cases as, for example, with the highly reactive extracts from some Californian crudes, where it is not possible to obtain a separation of the sludge when acid pretreating. In such cases the procedure for removing the sludge may be varied, as by mixing the requisite amount of acid and clay with the oil concomitantly, rapidly heating to about 130° C., cooling and filtering.

The desired extract is dissolved in approximately from one to two times its volume of liquid sulphur dioxide and the solution cooled to a temperature of about −15° to −20° C., and mixed with a sulphonating agent such as strong fuming sulphuric acid also preferably dissolved in liquid sulphur dioxide and at −15° to −20° C. The temperature is kept below +5° C. during the initial mixing and preferably below −5° C. Agitation should be employed, and the use of a jacketed autoclave, provided with a stirring device, thermometer, and pressure gauge, has been found desirable. The heat which which is evolved during and immediately after the addition of the acid can easily be controlled by circulating a cooling fluid through the jacket of the autoclave. At the end of the desired period, the sulphur dioxide may be separated as a vapor, by releasing the pressure at a temperature below 5° C.

To finish the preparation, the substantially sulphur dioxide free material may be mixed with twice its volume of ice-water, keeping the temperature below 20° C. There is a considerable amount of heat evolved at this step on account of the heat of dilution of the acids. After dilution, the aqueous solution or dispersion should be immediately batch-washed several times with 20% of its volume of gasoline, substantially all of which is volatile below 250° F. It is then neutralized with caustic soda, soda ash, or other neutralizing agent, following which the product may be dried by spraying, or on soap drying rolls, or the aqueous solution may be extracted with alcohol such as butyl, to remove it from the salt formed by neutralization.

This definite and specific description for the manufacture of the special type mineral oil sulphonate has been given to differentiate between the preferred material which functions exceptionally well in the new dispersing compositions and usually improving the color, odor, wetting, deterging, and emulsifying characteristics of said compositions, and the somewhat broader classes of mineral oil sulphonates that may be used according to the present invention but which hitherto have not been known to be satisfactory for this purpose.

The compounds of the broader class of mineral oil sulphonates obtained from other procedures of sulphonation of mineral oil extracts dissolved in liquid sulphur dioxide, such as described in the earlier filed Brandt application, Serial No. 117,096, while not fully equivalent to the preferred product, may likewise be used successfully in these compositions. Not only the salts of these acids but the other water-soluble derivatives as well as the acids themselves may be used.

Although these sulphonated petroleum extracts have unusual dispersing properties, it may be desirable, in making certain emulsions, for the purpose of imparting certain desirable properties thereto, to use suitable additional emulsifying agents including soaps, resinates, and other sulphated and sulphonated compounds; coloring matter such as dyes, lakes and pigments; germicides and insecticides, such as phenol mercury chloride, phenyl mercury nitrate, alkylated phenols, and mercuric chloride; abrasives and inert fillers such as grit, silex, pumice, feldspar, precipitated chalk, infusorial earth, bentonite, talc, air, and/or other gases; liquids including carbon tetrachloride, trichlorethylene, glycerine, alcohol, triethanolamine, carbitol, phenol, hexalin, pine oil, and naphtha; perfumes and deodorants; fats, oils, waxes, gums or resins; super-fatting agents; caustic soda, potash and ammonia; and any of the common water soluble salts such as sodium carbonate, borate, silicate, phosphate, sulphate, chloride, acetate, bicarbonate, hypochloride, thiosulphate, hydrosulphite, hyposulphate, and the water soluble meta-, tetra-, and pyro-phosphates, or the corresponding ammonium, amine, and potassium salts thereof. The type of addition agent to be used, of course, will depend on the ultimate use of the new composition.

As noted heretofore, these sulphonated petroleum extracts are very versatile and may be used in manufacturing and stabilizing aqueous dispersions of water insoluble or nearly water insoluble substances such as mineral oils, vegetable oils, paraffin, asphalt, tar, sulphur, rubber, resins, aliphatic, aromatic and terpene hydrocarbons, higher alcohols, and other oxygen-containing compounds. Still other uses are as emulsifiers for cosmetics, such as cold cream, vanishing cream, cleansing cream, and hand lotions, shaving creams, dental cream and shampoos, textile-, leather-, and paper-treating emulsions, paints, varnishes, lacquers, wood preservative, salad oils, and mayonnaise, ice cream, root beer, margarine, agricultural sprays, insecticides, germicides, laxatives, coating for paper and the like, floor, leather, automobile, furniture, and other types of polishes, inks, bituminous emulsions such as road binders, mold dressings, confections, dye emulsions, photographic emulsions, medicinal and pharmaceutical emulsions, emulsified solvents, and cutting and lubricating oils. Further, these agents may be used for emulsifying immiscible liquids to be reacted, such as aqueous ammonia and alkyl halides for the production of alkylamines.

As examples of some emulsion compositions that may be prepared in accordance with this invention, the following may be cited, although obviously many more formulas of the type contemplated may easily be devised by application of the general principles involved:

EXAMPLE I.—*Oil in water*

A mixture of 85% pine oil and 15% water containing 0.5% of the sulphonated mineral oil extract (50% active ingredient and 50% sodium sulphate) prepared according to the procedure disclosed in Serial No. 117,096, R. L. Brandt, was hand shaken in a flask until a cream-like emulsion was obtained. This emulsion showed no signs of breaking after six weeks' standing at room temperature, thus demonstrating the great resistance of this emulsion to electrolytes.

EXAMPLE II.—*Cold cream*

| | Per cent |
|---|---|
| Spermaceti | 12.0 |
| White beeswax | 12.0 |
| Liquid petrolatum | 55.0 |
| Borax | 0.6 |
| Sodium salt of the sulphonated mineral oil extract (inorganic salt-free) | 0.4 |
| Distilled water | 20.0 |
| Perfume | Q. s. |

The beeswax and spermaceti are melted on the water bath and then the liquid petrolatum is added. The borax and the sulphonated mineral oil extract are dissolved in the distilled water after it has been heated. This solution is added to the melted mixture while both are warm and at about the same temperature. This composition is then agitated rapidly until it is congealed. If perfume is desired, it may be added as soon as the composition begins to congeal.

EXAMPLE III.—*Vanishing cream*

| | Per cent |
|---|---|
| Stearic acid | 25.0 |
| Lanolin (anhydrous) | 5.0 |
| Triethanolamine | 1.0 |
| Triethanolamine salt of sulphonated mineral oil extract (sulphate-free) | 0.5 |
| Water | 68.5 |
| Perfume | Q. s. |

The stearic acid and lanolin are heated to 70° C. A solution of triethanolamine, sulphonated mineral oil extract and water are heated to boiling and then added to the melted fatty acid while constantly agitated. When a smooth mixture is obtained the perfume may be added. Agitation is continued while the composition is cooling until a heavy, smooth cream is obtained, after which it is periodically stirred until cold.

EXAMPLE IV.—*Cleansing cream*

| | Per cent |
|---|---|
| Stearic acid | 12.0 |
| Lanolin (anhydrous) | 4.0 |
| Liquid petrolatum | 26.0 |
| Sodium salt of sulphonated mineral oil extract (inorganic salt-free) | 2.0 |
| Diethylene glycol monoethyl ether | 5.0 |
| Water | 51.0 |
| Perfume | Q. s. |

The stearic acid is melted in the mineral oil after which the lanolin is added and the temperature of this oil solution is brought to 70° C. The sulphonated mineral oil extract is added to the water and the temperature of this solution is raised to 70° C. The two solutions are then combined while vigorously agitated to obtain a uniform emulsion. The diethylene glycol monoethyl ether, and perfume if desired, are added during the agitation, and uniform agitation is continued until a smooth cream is obtained. This cream is periodically stirred until it is cold.

EXAMPLE V.—*Hand lotion*

| | Per cent |
|---|---|
| Stearic acid | 1.0 |
| Liquid petrolatum | 5.0 |
| Diethylene glycol monoethyl ether | 5.0 |
| Gum tragacanth solution | 4.0 |
| Sodium salt of sulphonated mineral oil extract (inorganic salt-free) | 2.0 |
| Ethyl alcohol | 5.0 |
| Water | 78.0 |
| Perfume | Q. s. |

The stearic acid is melted in the petrolatum and diethylene glycol monoethyl ether at about 70° C. This mixture is subjected to vigorous agitation, while being mixed with the solution of water and sulphonated mineral oil extract which has been raised to the boiling point. Vigorous agitation is continued until the emulsion is uniform and then slowed until the temperature reaches 50° C. The gum solution is added at this point with mild agitation, after which the alcohol, containing the perfume, is added. Stirring is continued until the composition is completely cooled.

EXAMPLE VI.—*Shaving cream, lathering*

| | Per cent |
|---|---|
| Stearin | 28.0 |
| Cocoanut oil fatty acid | 8.0 |
| Caustic potash (50° Bé.) | 14.0 |
| Water | 45.0 |
| Glycerin | 3.0 |
| Sodium salt of sulphonated mineral oil extract (inorganic salt-free) | 2.0 |
| Perfume and/or antiseptic | Q. s. |

Most of the stearin (about 90%) is melted with the fatty acid and then introduced, with agitation, into the solution of the potash, water, and glycerin. Agitation is continued until the solution is cooled, at which time the balance of the stearin (about 10%) and the sulphonated mineral oil extract are added. When this composition becomes homogeneous it may be left to stand for 12 hours at which time the perfume and/or antiseptic may be added if desired. The composition is then permitted to stand for a period of days with intermittent agitation until it becomes a soft cream.

EXAMPLE VII.—*Shaving cream, brushless*

| | Per cent |
|---|---|
| Stearic acid | 20.0 |
| Soap | 5.0 |
| Sodium salt of sulphonated mineral oil extract (inorganic salt-free) | 3.0 |
| Water | 72.0 |
| Perfume and/or antiseptic | Q. s. |

The water is heated and the soap dissolved therein, after which melted stearic acid is slowly added while the solution is agitated until a heavy emulsion is formed. The sulphonated mineral oil extract is then added, whereupon the composition thins out. This emulsion is stirred while it is permitted to cool until the temperature lowers to 40° C., at which point the perfume and/or antiseptic may be added if desired.

EXAMPLE VIII.—*Shampoo, soapless*

| | Pts. by weight |
|---|---|
| Liquid petrolatum | 10 |
| Ammonium salt of sulphonated mineral oil extract (inorganic salt-free) | 10 |
| White oleic acid | 10 |
| Alcohol | 5 |
| Perfume | Q. s. |
| Water | To make creamy |

The petrolatum and sulphonated mineral oil extract are mixed and then have added thereto (in the order named) the oleic acid, the alcohol, and the perfume if desired. When thoroughly mixed, the water is added, with agitation, until the composition attains a creamy consistency.

EXAMPLE IX.—*Dental cream, milk of magnesia*

| | Per cent |
|---|---|
| Milk of magnesia | 23.0 |
| Precipitated chalk | 42.0 |
| Sodium salt of a sulphonated mineral oil extract (inorganic salt-free) | 1.0 |
| Glycerin | 19.5 |
| Gum tragacanth | 0.5 |
| Liquid petrolatum | 2.0 |
| Water | 12.0 |

Sulphonated mineral oil extract, glycerin, and gum tragacanth are mixed in the water and have added thereto a mixture of the precipitated chalk and milk of magnesia. When thoroughly mixed, the petrolatum is added and the composition is vigorously agitated until it becomes uniform.

Example X.—*Laxative, tasteless*

| | Per cent |
|---|---|
| Castor oil | 35.0 |
| Milk of magnesia | 5.0 |
| Sodium salt of sulphonated mineral oil extract | 0.5 |
| Water | 59.5 |

The milk of magnesia and sulphonated mineral oil extract are mixed with the water, after which the castor oil is added, and the emulsion thus formed is run through a colloid mill. Flavoring matter, such as vanilla or lemon extract, may be added if desired.

Example XI.—*Insecticide spray, concentrate*

| | Pts. by weight |
|---|---|
| Soap | 1.0 |
| Casein | 0.3 |
| Sodium salt of sulphonated mineral oil extract | 1.0 |
| Cresol | 1.0 |
| Water | 33.5 |
| Kerosene | 150.0 |

An aqueous solution is made of the water soluble ingredients and the kerosene is slowly added with vigorous agitation to form a uniform emulsion concentrate. One part of this emulsion concentrate is added to two parts of lead arsenate and 400 parts of water to form an insecticide spray.

Example XII.—*Cutting oil*

| | Per cent |
|---|---|
| Liquid petroleum | 90.0 |
| Ammonium salt of sulphonated mineral oil extract | 5.0 |
| Triethanolamine oleate | 5.0 |
| Water | As and when desired |

A soluble concentrated oil solution may be made by mixing triethanolamine oleate, sulphonated mineral oil extract, and 10% of the liquid petrolatum. This solution is thoroughly agitated to obtain uniformity. The balance of the petrolatum may be added at any time and agitated to form a uniform solution. Usually the water is added at the time of use to form a 5% to 25% oil solution which is stirred to obtain a uniform emulsion.

Example XIII.—*Polish, wax*

| | Per cent |
|---|---|
| Sodium salt of sulphonated mineral oil extract (inorganic salt-free) | 2.0 |
| Liquid petrolatum | 34.0 |
| Pumice powder | 5.0 |
| Amyl alcohol | 10.0 |
| Carnauba wax, powdered | 5.0 |
| Water | 44.0 |

The sulphonated mineral oil extract, petrolatum, alcohol, and wax are thoroughly agitated together and the water is slowly added with vigorous agitation. The pumice powder is then added and the composition agitated to secure uniform dispersion.

Example XIV.—*Margarine*

| | Parts |
|---|---|
| Cocoanut oil | 45.0 |
| Hardened vegetable oil | 25.5 |
| Cotton seed oil | 4.3 |
| Sodium salt of sulphonated mineral oil extract (inorganic salt-free) | .2 |
| Cultured milk | 45.0 |

The hardened vegetable oil, cocoanut oil, and cotton seed oil are melted and thoroughly mixed by vigorous agitation. This oil solution is chilled and then tempered to a solid but plastic condition. The milk is then added and kneaded therewith. At this time the sulphonated mineral oil extract is added and kneaded into the composition to form a uniform and stable emulsion. Any other desired ingredients, such as flavoring and/or coloring, may be added along with the extract.

Example XV.—*Mayonnaise*

| | | |
|---|---|---|
| Olive oil | lbs | 10 |
| Vinegar | lbs | 1.5 |
| Mustard | oz | 2 |
| Eggs | | 10 |
| Sugar | oz | 4 |
| Salt | oz | 4 |
| Pepper | teaspoon | 1 |
| Sodium salt of sulphonated mineral oil extract (inorganic salt-free) | oz | 0.2 |

The pepper, salt, sugar, and mustard are mixed and enough vinegar added to form a paste. The eggs and sulphonated mineral oil extract are then added with vigorous agitation to form an emulsion. Agitation is increased as the oil and the remainder of the vinegar are slowly added to form a creamy uniform emulsion.

Example XVI.—*Ice cream*

| | Parts |
|---|---|
| Cream | 130 |
| Milk | 225 |
| Sugar | 75 |
| Gelatine | 1 |
| Sodium salt of sulphonated mineral oil extract (inorganic salt-free) | 0.2 |

The cream and milk are thoroughly mixed and pasteurized. The sugar, gelatine and sulphonated mineral oil extract are then added with agitation until dissolved and uniformly dispersed throughout. This composition is then homogenized and frozen.

Example XVII.—*Bituminous (road binder)*

| | Per cent |
|---|---|
| Heavy road oil | 65.0 |
| Sodium salt of sulphonated mineral oil extract | 5.0 |
| Water | 30.0 |

The sulphonated mineral oil extract is added to the heavy road oil, such as petroleum residuum, coal-tar, or the like, and heated to a free flowing condition, after which it is thoroughly agitated. When thoroughly mixed, the water is added with vigorous agitation to form a stable uniform emulsion.

Example XVIII.—*Mold dressing*

| | Per cent |
|---|---|
| Mineral oil fraction | 15.0 |
| Water | 75.0 |
| Glycerine | 5.0 |
| Ammonium salt of sulphonated mineral oil extract (inorganic salt-free) | 5.0 |

The mineral oil fraction and sulphonated mineral oil extract are mixed to form a "soluble" oil which is added to the water in which the glycerine has been dissolved. This composition is thoroughly agitated to form a uniform emulsion.

Example XIX.—*Wood impregnating*

| | Pounds |
|---|---|
| Copper oleate | 15 |
| Butyl alcohol | 250 |
| Sodium salt of sulphonated mineral oil extract | 100 |
| Water | 5000 |

The copper oleate is dissolved in the butyl alcohol to which is added the sulphonated mineral oil extract. This composition is thoroughly mixed and then added, with agitation, to the water to form a uniform emulsion.

Example XX.—Rubber

| | Parts |
|---|---|
| Rubber | 200 |
| Benzene | 100 |
| Glue | 2 |
| Casein | 2 |
| Sodium salt of sulphonated mineral oil extract (inorganic salt-free) | 0.75 |
| Water | 79.25 |

The rubber, benzene, glue, and casein are mixed and masticated. The sulphonated mineral oil extract dissolved in the water is then slowly added until the rubber constitutes the dispersed phase of the batch.

Example XXI.—Latex

Fresh chloro-2-butadiene-1,3 is slowly added, with vigorous agitation to an equal part, by weight, of a 1% aqueous solution of the ammonium salt of sulphonated mineral oil extract free of inorganic salts. When uniformly mixed, this emulsion is stored at 10° C. for 24–48 hours. At the end of this period, the polymerization of chloro-2-butadiene-1,3 is substantially complete, and a fine dispersion of completely polymerized insoluble chloro-2-butadiene-1,3 polymer results. One percent of phenyl-beta-naphthylamine, based on weight of polymer, is dispersed by grinding in a ball mill with a small amount of water containing the sulphonated mineral oil extract, and the resulting dispersion is then mixed with the dispersion of chloro-2-butadiene-1,3. The final dispersion is suitable for use in the formation of impregnating and coating compositions.

Example XXII.—Paper coating

Lacquer phase

| | Per cent |
|---|---|
| Nitrocellulose, ½ sec | 38.5 |
| Triethyl citrate | 25.0 |
| Butyl acetate | 10.0 |
| Ethyl alcohol | 15.0 |
| Toluol | 11.5 |

Water phase

| | |
|---|---|
| Water | 99.0 |
| Triethanolamine salt of sulphonated mineral oil extract (sulphate-free) | 1.0 |

The lacquer solution is mixed and then added with agitation to the water containing the sulphonated mineral oil extract in the ratio of lacquer phase to water phase of approximately 3 to 1. This mixture is then emulsified by passing it through a colloid mill.

Example XXIII.—Lacquer (clear)

Lacquer phase

| | Per cent |
|---|---|
| Nitrocellulose ½ sec. (dry) | 18.5 |
| Ester gum | 18.5 |
| Dibutyl phthalate | 3.5 |
| Castor oil | 6.0 |
| Butanol | 10.0 |
| Hi-flash solvent naphtha | 10.0 |
| Secondary hexyl acetate | 33.5 |

Water phase

| | |
|---|---|
| Water | 78.5 |
| Acetone | 20.0 |
| Sulphonated castor oil | 1.0 |
| Sodium salt of sulphonated mineral oil extract (inorganic salt-free) | 0.5 |

The lacquer solution and aqueous solution containing the sulphonated mineral oil extract are mixed separately in the approximate proportions of 3 parts of lacquer solution to 1 part of aqueous solution. About one-fourth of the lacquer solution is dispersed in the aqueous solution and run through a colloid mill to form an emulsion. The remainder of the lacquer solution is then added to this emulsion and the whole mixture run through the colloid mill one or more times to complete the formation of the emulsion.

Example XXIV.—Photographic (dye layer)

| | |
|---|---|
| Nitrocellulose (dry) | 5 parts by weight. |
| Dyestuff (solid) | 3 parts by weight. |
| Amyl acetate | 90 parts by weight. |
| Gelatin (10% aqueous solution) | 500 cc. |
| Sodium salt of sulphonated mineral oil extract (inorganic salt-free) | 3.5 parts by weight. |

The solid dyestuff is dissolved in a solution of the nitrocellulose and amyl acetate. This solution is slowly added with vigorous agitation to the aqueous solution of gelatin and sulphonated mineral oil extract to form a uniform emulsion. This emulsion may be used and further treated according to the disclosure of Samuel E. Sheppard in U. S. Patent No. 1,290,794 of January 7, 1919.

Example XXV.—Photographic (light sensitive)

| | Parts |
|---|---|
| Polyglucuronic ammonium salt | 3.0 |
| Potassium bromide | 1.45 |
| Turkey red oil | 3.60 |
| Ammonium salt of sulphonated mineral mineral oil extract (inorganic salt-free) | 0.75 |
| Water | 150.00 |
| Silver nitrate | 1.70 |

The polyglucuronic salt, bromide, Turkey red oil, sulphonated mineral oil extract, and about two-thirds of the water are mixed and heated to 50° C. This solution is then mixed, in a dark room, with a solution of the silver nitrate and the remainder of the water. These solutions are agitated for about three-quarters of an hour at 50° C. to form a uniform emulsion. After cooling, the emulsion may be poured on paper, glass, or film and hardened by immersion in a solution of calcium chloride in ethyl alcohol. The coated stock may then be rinsed in water and dried at room temperature.

The above description and specific examples are to be taken as illustrative only. Any variations or departure therefrom which conforms to the spirit of the invention is intended to be included within the scope of the appended claim.

I claim:

A cosmetic cream emulsion comprising oleaginous and aqueous materials and, as an essential ingredient, a sulphonated material formed by sulphonating mineral oil extract while it is dissolved in liquid sulphur dioxide.

ROBERT LOUIS BRANDT.